UNITED STATES PATENT OFFICE.

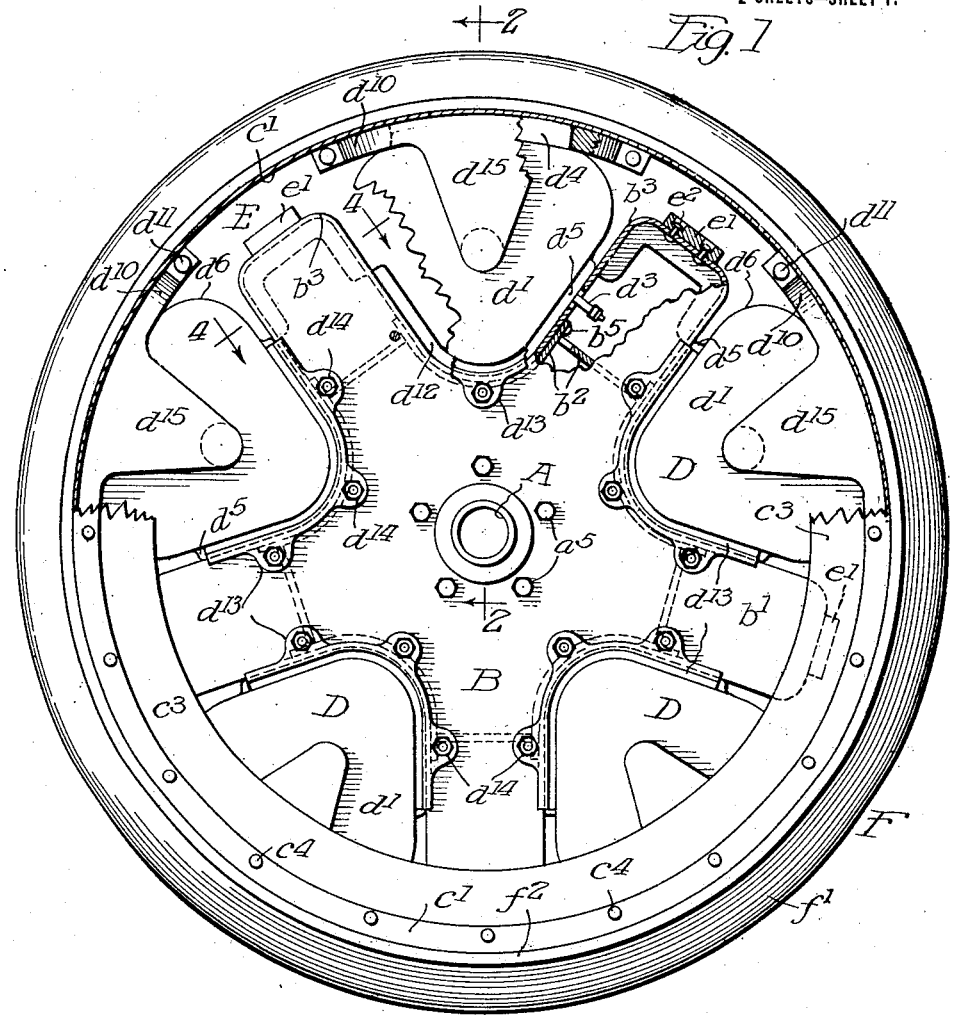

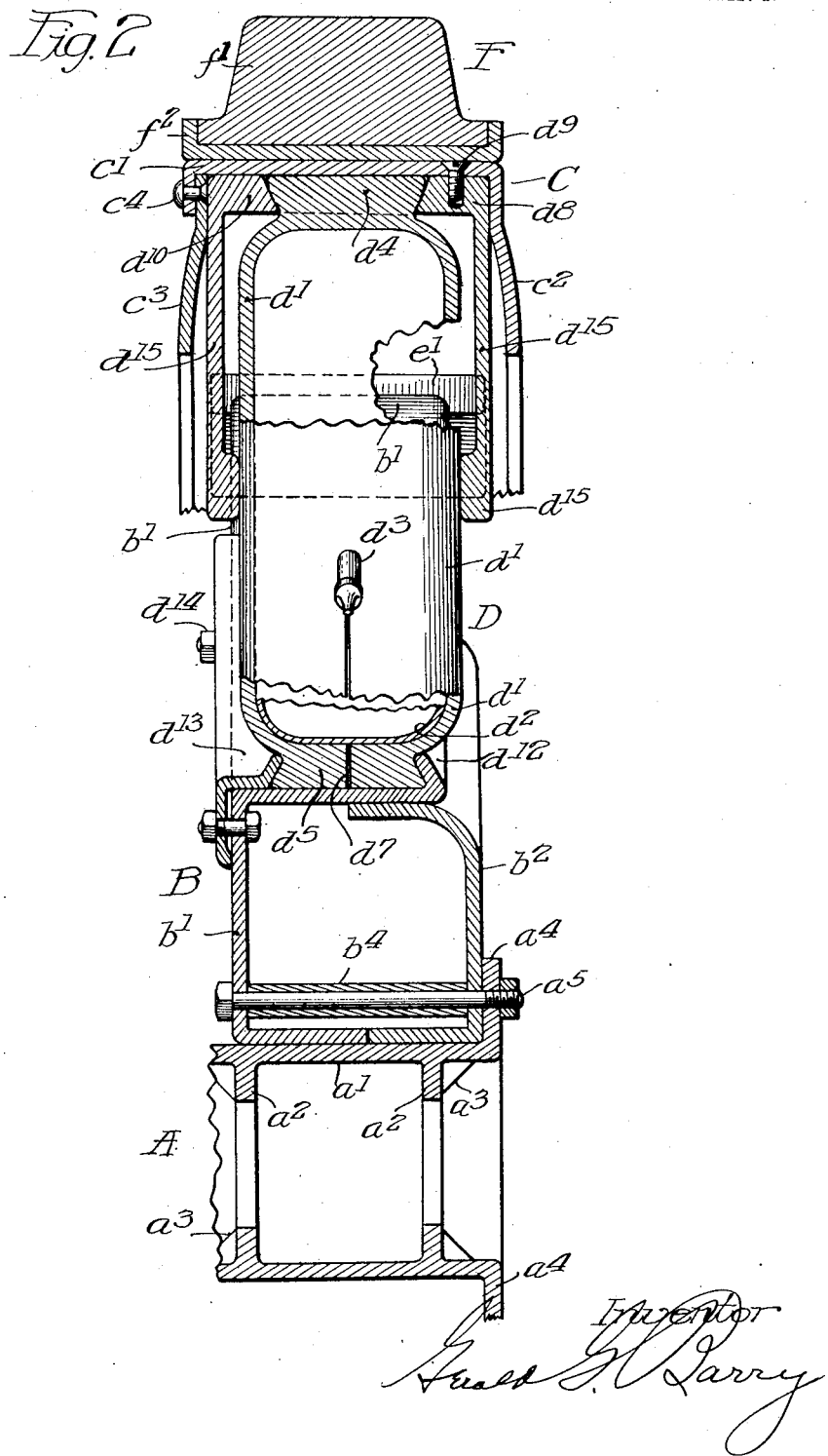

GERALD G. BARRY, OF CHICAGO, ILLINOIS.

CUSHION WHEEL.

1,404,424.  Specification of Letters Patent.  Patented Jan. 24, 1922.

Application filed January 8, 1919. Serial No. 270,180.

*To all whom it may concern:*

Be it known that I, GERALD G. BARRY, a citizen of the United States, and a resident of Chicago, in the county of Cook and State of Illinois, have invented certain new and useful Improvements in Cushion Wheels, of which invention the following is a specification.

The advantages of a pneumatic tire on the tread of a vehicle wheel in absorbing the vibrations and shocks of travel is well known. Such elements of the wheel assembly as ordinarily provided, however, having to directly meet the punishment from the road, are subject to great risk of punctures, blowouts, and increased wear and damage. The object of the present invention is to provide a structure wherein instead of simply one annular pneumatic tire there is a plurality of pneumatic cushion members and these are removed from direct contact with the road, are well protected from damage, the wear thereon reduced to a minimum, and other improved operating results realized. This is accomplished by a construction of wheel which is simple, low in cost, presents a pleasing appearance, and is altogether commercially practicable. The beneficial objects and the fact of the accomplishment of same will be more fully appreciated from a consideration of the following specification of the invention, in connection with the accompanying drawings which form a part of the specification.

Referring to the drawings, Fig. 1 is a side elevation of a wheel constructed in accordance with my invention, portions being shown broken away to permit of explanatory reference; Fig. 2 is a transverse section taken on the line 2—2 of Fig 1, part of the pneumatic cushion being in full, however, to show the valve; Fig. 3 is a view showing a pair of the cleats employed to clamp one portion of the bead on the periphery of the cushion to the rim; and Fig. 4 is a section taken on the line 4—4 of Fig. 1, illustrating the way in which the metal of the original sheet metal blank removed to provide the openings between the spokes is utilized to form the sides of the spokes and also the inner part turned back to form one of the clincher flanges to hold the cushions and above this and at the ends of the spokes the flange is swung inwardly both portions of such flange adding to the strength of the spoke structure.

In the description herein of my invention and in the accompanying drawings, similar letters and marks of reference are used to designate like parts throughout; capital letters are employed in referring to the main wheel elements generally, and the subdivided details of these, or the particular features to be referred to specially, are indicated by lower case corresponding letters of the alphabet with differentiating numerals.

The new wheel, speaking generally, is comprised of a hub, element A, spoke structure B, rim member C, and the latter instead of being normally rigidly secured to the spoke ends, is floatingly carried upon the new cushion element D, now operatively positioned between the rim and the spoke or body structure. Element E designates a solid rubber bumper secured at the ends of each of the spokes to act as a cushion stop against excessive lateral or vertical movement relatively between the main wheel elements. While the metal rim, element C, may have direct contact with the road and serve as the road tire, it will of course be preferable to provide a solid rubber tire on the rim, element F herein.

Any suitable form of a hub, element A, may be employed. The drawings illustrate a common form of automobile front wheel hub, in which $a^1$ marks the main hub body, which is usually provided with the inwardly extended flanges $a^2$ and the hardened ground steel raceways $a^3$ for the roller or ball bearings carried upon the shaft (not shown). $a^4$ indicates a flange extending outwardly circumferentially around the inner end of the hub body and to which the spoked supporting body of the wheel is secured by bolts or other suitable fastening means $a^5$.

In the spoked hub supporting structure, element B, various changes may be made, but I much prefer the pressed metal construction herein illustrated, in which $b^1$ marks the main outside sheet metal supporting member, in which a series of openings are provided for housing the cushion elements, thus providing a series of spokes, there being an undulatory integral flange following around the ends and sides of the spokes and the curved wall between the adjacent spokes. The method of forming such pressed sheet metal spoked hub supporting members will be found more fully set forth in my pending application, Serial No. 265,934. $b^2$ is also a sheet metal support, likewise mounted on the hub, parallel with but spaced apart from member $b^1$. The outer flange on this member $b^2$ is shown bent over below the ends of the spokes of $b^1$. The two members are telescoped together as illustrated. $b^3$ marks the undulating flange following around member $b^1$ and forming the ends and sides of the spokes and the curved wall of the body between and uniting the spokes. In forming the central opening on the blanks to receive the hub the metal of the sheet blank is drawn or spun to form a shoulder flange which may rest on the main hub body $a^1$, maintaining the spaced relation between the plates and strengthening the supporting body. $b^4$ is a sleeve which may be provided over the bolts $a^5$ which secure the supporting body to the hub flange $a^4$, such sleeves to further strengthen the structure centrally and maintain the spaced relation of the two plate members. The outer flange drawn from the sheet metal blank $b^2$ which it will be noticed is telescoped within the member $b^1$, may extend all the way across the spaced distance rather than only part way at the bottom as shown in Fig. 2. The outer part of $b^2$, however, instead of extending to the spoke ends of member $b^1$ is directed all the way across but below the spoke ends, and a tongue may be struck up and fastened, as indicated at $b^5$, although telescopically shrinking the flanges of the two members $b^1$ and $b^2$ together will of itself suffice to hold same.

The road rim, element C, may be comprised of an annular band $c^1$, provided with inwardly extended flanges or side plates $c^2$ and $c^3$. These side flanges extend inwardly deep enough to be beyond the ends of the spokes, which it will be noticed are thus at all times enclosed within the same but are normally free of contact with the rim band or the side flanges. The flange on one side $c^3$ is shown detachable, so as to permit the rim to be positioned over the spokes, and this side $c^3$ may then be secured to the band $c^1$, or to the narrow flange bent therefrom, by bolts as indicated at $c^4$.

The metal rim just mentioned when operatively mounted on the cushions and in floating relation with the hub supporting structure, as will be presently described, may be employed directly as the road tire, but it will be generally preferred to mount thereon a solid rubber tire, herein indicated as element F, for the direct tread member.

The new cushioning element D includes a series of independent pneumatic cushions and the means for securing same to the rim and spoked hub supporting structure. The drawings show a series of five of these cushions. However, the particular number of cushions employed is not a feature of the invention. The road rim and the spoked hub supporting structure are maintained in a floating relation with each other upon this series of pneumatic cushions.

The cushions proper each comprise an outer casing $d^1$ and a removable inner air bag $d^2$, provided with a valve device $d^3$ for inflating or deflating the same. The casing, inner air bag, and valve respectively may be made of the same material as the casing, inner tube and valve therefor of the ordinary pneumatic tire.

The casing $d^1$ has on the outer periphery thereof two separated thickened portions or clincher beads $d^4$ and $d^5$. The clincher bead $d^4$ is fastened to the rim band $c^1$, and the bead $d^5$ to the spoke structure, the latter partly at the sides of the adjacent pair of spokes and also to the curved wall of the body between and uniting adjacent spokes. It will be noticed there is left on each side of each casing an intervening portion of the periphery, marked $d^6$, which is not so thickened and is not fastened to either the rim or to the spoked supporting structure. This allows the necessary movement to take place between the fastened portions.

The clincher bead $d^5$ is split, as indicated at $d^7$, and adapted to be opened for the purpose of inserting or removing the inner air bag $d^2$. The valve $d^3$ is shown extended through the side wall of the spoke in the open space above the flanged end on member $b^2$, and is thus protected but accessible for working. The valve may be provided with a protecting dust cap the same as the valves on ordinary pneumatic tires.

The bead $d^4$ is secured to the rim band $c^1$ by a fastening means which may consist of a pair of cleats, one of which, marked $d^8$, is secured by screws or otherwise to the rim band, as indicated at $d^9$. The cleat $d^{10}$ on the other side, however, is detachably secured either to the rim or, as shown, to the first mentioned cleat at the ends thereof, as indicated at $d^{11}$. Thus it will be noticed the bead $d^4$ is detachably clamped between the cleats which in turn are secured to the rim band $c^1$.

The inner bead $d^5$ is detachably secured to the spoked hub supporting structure. $d^{12}$ marks a clincher flange which may be provided from the original blank $b^1$ when the series of openings leaving the spokes projecting are formed, as already mentioned. The fastening on the opposite side, however, is a separate curved cleat $d^{13}$, detachably secured by the bolts and nuts $d^{14}$ to the wall of the sheet metal support member $b^1$. Obviously the cleat $d^{12}$ may likewise be a separate piece secured to the inside, instead of being formed integrally as here shown.

The fastening means $d^{12}$ and $d^{13}$, are curved and embrace part of the side walls of adjacent spokes and the curved wall of the body uniting the same. Thus the inner bead or thickneneed portion of the periphery $d^5$ of the cushions, as well as the outer bead $d^4$, is detachably secured to the spoked hub supporting structure and there is, as already noticed, a free space of the periphery, marked $d^6$, which is not secured to either the rim or the spoke structure. It will be apparent that this free portion $d^6$ of the periphery is adapted to permit the necessary resilient or flexing action between the two fastened portions of the pneumatic cushions.

Any such pneumatic cushion when filled with air under pressure will have a tendency to assume a spherical shape. To limit this there may be provided arms $d^{15}$ on each side of the cushions, the arms extending from the cleats $d^8$ and $d^{10}$. The arms $d^{15}$ have an inwardly projecting boss contacting with the center of the cushion body; or the cushion may have a thickened hard boss on each side at this central point. I also contemplate the use of a metal button, or metal covering on the bosses on the cushion, to prevent any undue frictional wear at this central point where such means limiting the expansion are used. It is to be understood, however, that such limiting means is not absolutely necessary, and it may be preferred to allow the cushions to fully expand even though the center portion may extend transversely of the wheel beyond the line of the rim's edges. It will not extend much beyond this protecting edge, however, and the effect of striking a curbing, for example, will be less damaging than with the ordinary pneumatic tire; and the size may be such as not to render the appearance displeasing.

I prefer to make the cushions substantially of the form herein illustrated. The body of the wheel may be made of thin sheet steel and be light in weight, while at the same time affording great strength. The pneumatics conforming to the housing opening thus provided may be properly secured, and the natural curved form of the casing body which is not secured is free to expand naturally. It will be noticed these pneumatic cushions are not made annular in form, like small tires having a central mounting therethrough, but the cushions illustrated are more simple and cheap to make and also more effective in that they provide greater cubic inches of air under pressure per square inch of casing and air bag covering than with an annular form.

Element E is a bumper or cushion stop, one of which is preferably provided at the end of each of the spokes. These may be made of solid rubber blocks $e^1$, not vulcanized to a very hard degree. Each block is secured to the outer end of a spoke by screws or otherwise, as indicated at $e^2$. The blocks $e^1$ extend laterally slightly beyond the spoke wall, but not normally in contact with the flange $c^2$ or $c^3$, there being a small free space therebetween, as well as a greater space between the rim band $c^1$ and the top of the blocks $c^1$. It will be observed that the normal resilient action between the main body elements can take place on the pneumatic cushions, but any excessive movement, either laterally or vertically, is thus limited and meets with a cushioning, silent stop, rather than that of metal to metal.

Element F indicates a solid rubber road tire which may be suitably mounted upon the rim C. $f^1$ marks the rubber, and $f^2$ its separate mounting band. However, no such rubber tread is absolutely necessary, as it will be obvious that the plain metal band $c^1$ may serve in direct contact with the road. In the claims, therefore, when I speak of the road rim, it will be understood that I mean either with or without the solid rubber tire for the tread member.

The depth of rubber on this tire member $f^1$ may now be less than is deemed sufficient in the ordinary use of solid rubber tires,—this by reason of the effect of the supplemental cushions of element D. I also prefer to vulcanize this solid rubber tread member $f^1$, if employed at all, to a harder degree than is usual, in order to better withstand the road punishment, and for the function of absorbing the shocks and vibrations of travel to depend more upon the pneumatic cushions. It will also be found that the life of a solid rubber tread member will be greatly lengthened by reason of the employment of the supplemental pneumatic cushions in the wheel structure. The cushioning effect of such a connected series of pneumatic cushions in absorbing the vibrations and shocks of travel will be found substantially the same as with a pneumatic tire on the tread, but without the same risks of damage and wear. Repairs and replacements are easily made should it become necessary, and if one of the series of cushions does become deflated, the entire wheel is not out of commission.

In the foregoing I have described my invention in its preferred embodiment somewhat in detail, but it will be obvious that various changes may be made in the construction without departing from the spirit and scope of the invention. I do not wish any undue limitation to result from the detailed description given of some of the parts, but desire the claims appended hereto to be construed as broadly as possible in view of the prior art relating to cushion wheels.

Having described my invention, what I claim as new and desire to secure by Letters Patent is the following:

1. In a wheel of the character herein described having a hub, a spoked supporting element secured thereto, and a road rim circumferentially surrounding but spaced apart from the outer ends of the spokes of said hub supporting element, a series of pneumatic cushions, each operatively positioned between a pair of spokes, each said pneumatic cushion comprising an inner bag provided with a valve, an outer flexible covering adapted to removably enclose the whole said inner bag and said outer covering being provided with thickened portions at two separated portions of the periphery thereof, means for detachably securing one of said thickened portions to the rim member, means for detachably securing the other thickened portion of said covering to the spoke structure between a pair of spokes and not extended to the spoke ends, and a further portion of the periphery of said covering on opposite sides which is not thickened or secured but which is free to permit of resilient action, flanges on or connected to the rim along the sides and extending inwardly beyond the ends of the spokes and normally free of frictional contact with the surface of the cushions, solid rubber cushions on the spoke ends and projecting beyond the sides thereof adapted to provide a cushion stop against excessive lateral or vertical movement between the rim and the floating hub supporting structure, and means to limit the tendency of the pneumatic cushions to assume a spherical shape.

2. In a wheel of the character herein described having a hub, a spoked supporting element secured thereto, and a road rim circumferentially surrounding but spaced apart from the outer ends of the spokes of said hub supporting element, a series of pneumatic cushions substantially of the shape herein shown, each operatively positioned between a pair of the spokes, each said pneumatic cushion comprising an inner bag provided with a valve, an outer flexible covering adopted to removably enclose the whole said inner bag and said outer covering being provided with thickened portions at two separated portions of the periphery thereof, means for detachably securing one of said thickened portions to the rim member, means for detachably securing the other thickened portion of said covering to the spoke structure between a pair of spokes and not extended to the spoke ends, and a further portion of the periphery of said covering on opposite sides which is not thickened or secured but which is free to permit of resilient movement, means to limit any excessive tendency of the pneumatic cushions to assume a spherical shape when filled with air under pressure, and flanges on or connected to the rim along the sides and extending inwardly beyond the ends of the spokes but normally spaced apart therefrom, and not having contact with the pneumatic cushion members.

3. In a wheel of the character herein described having a hub, a spoked supporting element secured thereto, and a road rim circumferentially surrounding but spaced apart from the outer ends of the spokes of said hub supporting element, a series of pneumatic cushions, each operatively positioned between a pair of the spokes and the rim each cushion having a portion of its periphery secured to the inside of the rim, a further portion of the periphery secured to the spoke structure between a pair of spokes and not secured at the spoke ends, and there being also between the portions of the periphery secured to said rim and said spoke structure an intervening portion thereof which is free to permit of resilient action, flanges on or connected to the rim along the sides and extending inwardly beyond the ends of the spokes, and solid rubber cushions on the spoke ends and projecting beyond the sides thereof adapted to provide a cushion stop against excessive lateral or vertical movement between the rim and the floating hub supporting structure.

4. In a wheel of the character herein described having a hub, a spoked supporting structure rigidly secured thereto, and constructed of sheet metal substantially as herein described, a road rim circumferentially surrounding but spaced apart from the outer ends of the spokes of said hub supporting element, a series of pneumatic cushions, each operatively positioned between a pair of the spokes, each cushion having a thickened portion of its periphery secured to the inside of the rim, a further thickened portion of the periphery secured to the spoke structure between a pair of spokes but not secured at the spoke ends and there being between the portions of the periphery secured to said road rim and said spoke structure an intervening portion thereof which is free to permit of resilient action, means to limit any excessive tendency of the pneumatic cushions to assume a spherical shape when filled with air under pressure, flanges on or connected to the rim along the sides and extending inwardly beyond the ends of the spokes, and solid rubber cushions on the spoke ends and projecting beyond the sides thereof adapted to provide a cushion stop against excessive lateral or vertical movement between the rim and the floating hub supporting structure.

5. In a wheel of the character herein described having the combination with a hub, a spoked supporting element secured thereto, and a road rim circumferentially surrounding but spaced apart from the outer ends of the spokes of said hub supporting element, a series of rubber cushions, each operatively positioned between a pair of the spokes, each cushion having a portion of its periphery secured to the inside of the rim, a further portion of the periphery secured to the spoke structure, and there being also between the said rim and spoke secured portions of the periphery an intervening portion thereof which is free to permit of flexing, flanges on or connected to the rim along the sides of and extending inwardly beyond the ends of the spokes, and arranged to be free of frictional contact with the surface of the cushions and solid rubber bumpers positioned between the spokes and rim members adapted to provide a cushion stop against excessive lateral or vertical movement between said rim and the floating hub supporting structure.

6. A vehicle wheel comprising a hub, a spoked supporting structure rigidly secured thereto, an annular rim spaced apart from the spoke ends, a series of suitable pneumatic cushions each of which is operatively positioned between a pair of spokes and secured to the rim and spoked hub supporting structure for floatingly carrying said hub supporting structure, flanges on each side of the rim extending inwardly beyond the ends of the spokes which normally float on the cushions within the same, said flanges being arranged to be free of contact with the surface of the cushions, and means at the spoke ends adapted to provide a cushion stop to excessive vertical or lateral movement relatively between the rim and hub supporting structure.

7. A vehicle wheel comprising a hub, a spoked supporting structure rigidly secured thereto, an annular rim spaced apart from the spoke ends, a series of cushions each of which is operatively positioned between a pair of spokes and secured to the rim and spoked hub supporting structure for floatingly carrying said hub supporting structure, flanges on each side of the rim extending inwardly beyond the ends of the spokes within the same, said flanges being arranged to be free of contact with the surface of the cushions, and bumpers at the spoke ends adapted to provide a cushion stop to excessive vertical or lateral movement relatively between the rim and hub supporting structure.

8. A vehicle wheel including in combination a hub, a spoked supporting structure rigidly secured thereto, an annular rim spaced apart from the spoke ends, a series of cushions each of which is operatively positioned between a pair of spokes and separately secured to the rim and spoked hub supporting structure for floatingly carrying said hub supporting structure, and side plates or flanges on each side of the rim extending inwardly beyond the ends of the spoke structure, which normally floats on the cushions within the rim, said side plates or flanges having no contact with the cushions.

9. In a vehicle wheel the combination of a hub, a spoked supporting structure rigidly secured thereto, an annular rim spaced apart from the spoke ends, a series of cushions each of which is operatively positioned between a pair of spokes and secured to the rim and spoked hub supporting structure for floatingly carrying said hub supporting structure, the fastening to the spoke structure being hubwardly of and not at the spoke ends and there being below the spoke ends and between the rim and spoke ends on each side of the cushions portions which are entirely free for flexing, and means adopted to provide a stop to excessive vertical or lateral movement relatively betwen the rim and hub supporting structure.

10. In a vehicle wheel including a road rim member and spoked hub supporting structure floatingly mounted within the rim member, a plurality of pneumatic cushion members for floatingly carrying the said spoked hub supporting structure within the rim, each of said pneumatic cushions comprising an outer casing and an inner air bag removable from the casing, the air bag provided with a valve through which to inflate or deflate same, the outer casing being provided with two separated thickened clincher beads on the periphery, means for detachably clamping one of said beads to the rim member, means for detachably clamping the bead on the opposite portion of the periphery to the hub supporting structure at the nave portion and part way up adjacent spoke sides but free of the spoke ends, and there being between the two said beads an unconnected portion of the periphery adapted to permit of the necessary movement, and means in contact with each cushion, centrally thereof but not extending therethrough, to restrict undue lateral expansion of the cushions.

11. In a vehicle wheel including a road rim member and spoked hub supporting structure floatingly mounted within the rim member, a plurality of pneumatic cushion members for floatingly carrying the said spoked hub supporting structure within the rim, each of said pneumatic cushions comprising an outer casing and an inner air bag removable from the casing, the air bag provided with a valve through which to inflate or deflate same, the outer casing covering the entire inner bag and being provided with two separate thickened clincher beads on the periphery, means for detachably clamping one of said beads to the rim member, means for detachably clamping the bead on the opposite portion of the periphery to the hub supporting structure at the nave portion and part way up adjacent spoke sides but free of the spoke ends, and there being between the two said beads an unconnected portion of the periphery adapted to permit of the necessary movement.

12. In a vehicle wheel of the character described, pneumatic cushions substantially of the form herein shown, said cushions each comprising an outer casing having separate portions of the periphery adapted to be fastened respectively to the rim and the spoke structure of the wheel at the nave portion and free at the spoke ends and also free portions of the periphery between the fastened portions, and an inner air bag removable from the casing, the casing being adapted to entirely enclose the inner air bag and provided with a parting to permit the insertion or removal of said inner bag, a valve for the inner air bag accessible from the outside to inflate or deflate the bag, and means to limit undue lateral expansion of the cushions when inflated.

In testimony whereof I have hereunto signed my name to this specification.

GERALD G. BARRY.